United States Patent [19]

Gibb

[11] 4,369,661
[45] Jan. 25, 1983

[54] AUTOMATIC NULLING CIRCUIT FOR TRANSIENT PRESSURE RATE CHANGES

[76] Inventor: Owen L. Gibb, 2218 Clark La., Redondo Beach, Calif. 90278

[21] Appl. No.: 178,619

[22] Filed: Aug. 15, 1980

[51] Int. Cl.³ .............................................. G01L 21/12
[52] U.S. Cl. ..................................... 73/755; 374/65 R
[58] Field of Search ................ 73/755, 708, 701, 49.2, 73/49.3, 52, 40, 746; 323/366; 324/DIG. 1, 65 R

[56] References Cited

U.S. PATENT DOCUMENTS

| | | | |
|---|---|---|---|
| 2,511,855 | 6/1950 | Keck et al. | 73/708 |
| 3,079,800 | 3/1963 | Hoar | 73/755 |
| 3,778,710 | 12/1973 | Snook | 324/130 |
| 4,242,665 | 12/1980 | Mate | 324/DIG. 1 |

Primary Examiner—Donald O. Woodiel
Attorney, Agent, or Firm—Richard S. Koppel

[57] ABSTRACT

An automatic nulling circuit applicable to small leak detection in vacuum chambers. A pressure sensitive, variable impedance element is connected as one branch of a bridge circuit, another branch of which comprises an adjustable impedance circuit. The voltage across the two branches are normally balanced by means of an amplifier circuit which amplifies any differential between the branch voltages, and a feedback circuit between the amplifier output and the adjustable impedance element. The amplifier and feedback circuits, however, introduce a time lag such that the two branches are unbalanced, resulting in an amplified output, in response to a changing sensed pressure. A filter circuit removes the effects of long term pressure changes, whereby the nulling circuit produces an output only for short term transients in the rate of pressure change, such as those associated with small leak testing.

10 Claims, 2 Drawing Figures

AUTOMATIC NULLING CIRCUIT FOR TRANSIENT PRESSURE RATE CHANGES

BACKGROUND OF THE INVENTION

1. Field of the Invention

This invention relates to automatic nulling circuitry, and more particularly to a nulling circuit for isolating and detecting transient disturbances in the rate of pressure change sensed by a pressure sensing apparatus.

2. Description of the Prior Art

In many applications it is important to detect the presence of small leaks in a vacuum system (the term "vacuum" as used herein refers to any low pressure system, and is not limited to an absolute vacuum). A common method for detecting slow leaks makes use of the leak to establish a short term transient disturbance in the pressure within the vacuum chamber. If such a disturbance is detected, the presence of a leak is indicated.

Various methods may be used to establish the initial disturbance. According to one method, the leak is first found with a tracer liquid or gas, and then plugged. As the chamber will continue to be pumped after the leak has been plugged, a transient disturbance to the steady state pressure condition is established which can then be detected to indicate the presence and magnitude of the leak. In another technique, the outside of suspected areas on the vacuum chamber is subjected to a small blast of a lighter gas, such as helium, which passes through any leaks in the area and into the vacuum system. The introduction of the lighter gas also causes a pressure disturbance, which when detected indicates the presence of a leak.

One problem in detecting the relatively small pressure disturbances resulting from small leaks is that such pressure changes can be masked by larger pressure changes in the system. For example, rapid pressure changes take place as the system is pumped down from atmospheric pressure to the desired vacuum level. In order to detect small leaks during this period of time, a leak detection system must be operative over the full range of pressures from atmospheric to the desired vacuum level, and must also be able to discriminate between the large rate of pressure change due to pumping of the system, and the relatively small rate of change due to the leak. Once the vacuum chamber has been largely evacuated, it is frequently found that its internal pressure does not stabilize at a steady level but rather continues to vary, creating a need for continual vacuum pumping. Such instability may result from a drift in the pump speed, from long term changes in leak rates, or from the vaporization of volatile materials such as water within the chamber, otherwise known as outgassing. An ideal small leak detector should be able to discriminate between small leaks and the affects of the foregoing phenomena. Furthermore, the detector should be capable of eliminating the effects of gross leaks, which otherwise could mask the presence of small leaks.

Mass spectrometers have sufficient sensitivity over a large pressure range to function as effective small leak detectors, and have been used as such in the prior art. However, mass spectrometers have been found to saturate under gross leak conditions, and require considerable periods of time to again become operable.

An improved small leak detector is disclosed in U.S. Pat. No. 4,106,350, issued Aug. 15, 1978 to Richard T. Morris and Arthur H. Wildvank. According to the teachings of the patent, a very thin resistance wire is lodged in a gas passage way within the evacuated chamber. The resistance wire is sensitive to its ambient pressure, and in effect is a form of thermistor. The resistance of the wire is determined by its temperature, which in turn is dependent upon the temperature and thermal conductivity of immediately surrounding gas and the ability of the gas to conduct heat away from the wire. Since transient changes in the gas temperature may accompany pressure changes, in accordance with the equation of state, pressure readings are obtained by using the wire to sense the thermal properties of the surrounding gas.

The patent discloses electrical circuitry which is capable of responding to pressure changes sensed by the wire, and providing desired readouts. This circuitry is illustrated schematically in FIG. 1. The pressure sensitive resistance wire is indicated by block 2. A voltage source 4, preferably of the bridge rectified, tracking regulator type which is relatively insensitive to variations to the line voltage, produces an output voltage sufficient to drive a desired level of current through the resistance wire 2. That wire is connected as one leg of a Wheatstone bridge circuit 6, the normally balanced output of which is supplied to a transient readout section enclosed in dashed lines and indicated by numeral 8, and also to a pressure readout section also enclosed in dashed lines and indicated by numeral 10.

Transient readout section 8 comprises a differential preamplifier 12 having positive and inverted inputs which receive the normally balanced output of bridge network 6, an amplifier 14 which receives the output of preamplifier 12 and includes a feedback connected null circuit 16, a second amplifier 18 which amplifies a signal from null circuit 16, and a transient readout means 22 such as an analog current meter, which records the output level of amplifier 18 or sounds an alarm in response thereto, as required.

The steady state portion of the circuit comprises a differential preamplifier 24 which is connected to amplify an unbalanced signal produced by bridge circuit 6, an amplifier 26 connected to the output of preamplifier 24, and a steady state pressure readout device 28, such as a digital voltmeter, which is actuated by amplifier 26.

Null circuit 16 in transient readout section 8 is connected to balance the output of amplifier 14 with its input. Amplifier 14, and null circuit 16, however, have a predetermined response time that introduces a delay in the propagation of an input signal. As a result, steady state pressure conditions are nulled out, while transient disturbances in the pressure within the chamber create an imbalance between the input and output of amplifier 14. This imbalance is transmitted by null circuit 16 for amplification by amplifier 18, the output of which is supplied to transient readout device 22.

The reference patent accordingly provides a means for isolating the low level pressure effects of small leak detection by the use of automatic null circuit 16. However, the circuit has been found to be less then fully effective for small leak detection over large pressure ranges because of a tendency of preamplifier 66 to saturate under extended changes of pressure. Accordingly, there is still a need for a device capable of isolating and detecting the relatively small transient disturbances in the rate of pressure change which accompany testing for small leaks.

SUMMARY OF THE INVENTION

In view of the above problems associated with the prior art, it is an object of the present invention to provide a pressure sensing apparatus which is sensitive to short term transient disturbances in the rate of change of the sensed pressure, over an extended absolute pressure regime from atmospheric to vacuum levels.

Another object of the invention is the provision of such a pressure sensing apparatus, in which short term pressure disturbances accompanying small leak testing can be isolating from gross rates of pressure change.

A further object is the provision of an automatic nulling circuit for isolating and detecting short term transient disturbances in an electrical signal, which does not go into saturation under conditions of gross change in the electrical signal.

These and other objects of the invention are realized in a pressure sensing apparatus which is capable of generating an electrical signal, the magnitude of which corresponds to a sensed pressure. Short term transient disturbances in the rate of change of the sensed pressure, such as disturbances which accompany testing for small leaks, are isolated from gross changes of pressure by circuitry which includes an adjustable reference circuit establishing an adjustable reference signal. A comparison circuit compares the pressure signal with the reference signal, and produces an output signal which is representative of the differential between the compared signals.

A feedback circuit, having a response time which together with the response time of the comparison circuit is greater than substantially the duration of the transient disturbance which is sought to be detected, connects the output of the comparison circuit to the adjustable reference circuit. The reference signal is adjusted to a predetermined relationship with respect to the pressure signal, as delayed by the overall response time. As a result, substantially constant rates of pressure change appear as steady state signals at the output of the comparison circuit, while the desired short term transient deviations from the constant rates appear at the output of the comparison circuit as deviations from such steady state signals, the duration of such deviation signals corresponding to the omparison circuit time constant. With the provision of a filter at the output of the comparison circuit to remove low frequency components from said output, an automatic nulling circuit is achieved which responds only to short term transient disturbances in the rate of change of the sensed pressure.

In a preferred embodiment of the invention, a variable impedance element such as the resistance wire of the Morris et al patent, is connected as one branch of a bridge circuit. An adjustable circuit means is connected as another branch, the impedance of which can be adjusted to substantially balance the operative impedance of the variable impedance element. An amplifier circuit is connected to amplify the voltage differential between the variable impedance element and the adjustable circuit means. A feedback circuit connects the output of the amplifier circuit with an adjustment input to the adjustable circuit means to balance the impedance thereof with the variable impedance element, as delayed by the response time of the amplifier circuit. The amplifier output thus represents the difference between the present impedance of the variable impedance element and the impedance of that element at about one amplifier response time previous. Filter means at the output of the amplifier circuit remove low frequency components, thus providing an automatic nulling circuit which responds substantially only to short term transient disturbances in the rate of change of sensed pressure.

The adjustable circuit means may comprise a field effect transistor connected in series with a resistor element, while the amplifier circuit preferably comprises a two-stage amplifier with the bridge circuit connected to the input of the first stage, and the feedback circuit connected to the output of the second stage. The apparatus further includes readout means which are connected to display detected transient disturbances in the rate of pressure change.

These and other objects and features of the invention will be apparent to those skilled in the art from the following description of a preferred embodiment, taken together with the drawings, in which:

DESCRIPTION OF A PREFERRED EMBODIMENT

Figure 1:
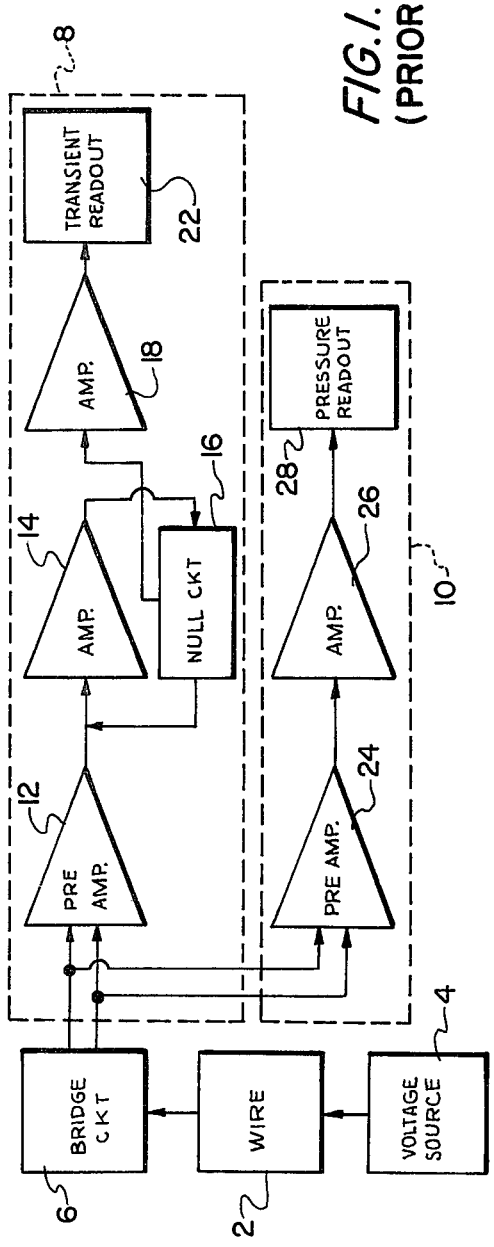
FIG. 1 is a schematic diagram of circuitry employed in prior art U.S. Pat. No. 4,106,350.
Figure 2:
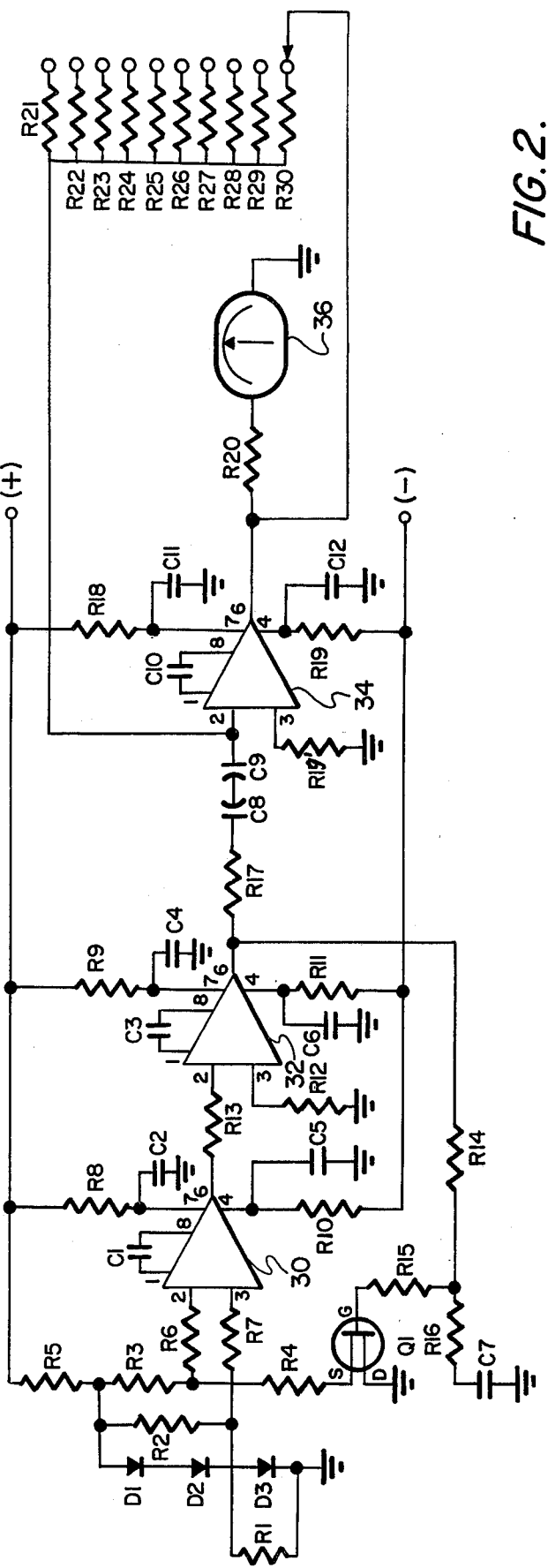
FIG. 2 is a circuit diagram of the circuitry employed in the present invention for isolating and detecting short term transient disturbances in the rate of change of a sensed pressure.

An exemplary embodiment of the present invention is shown in FIG. 2. The circuit depicted in this figure is adapted to be employed in conjunction with the pressure sensing apparatus disclosed in the U.S. Pat. No. 4,106,350, subject to the improved circuitry described below. The variable resistance wire employed in this patent, identified by reference numeral 2 in FIG. 1 herein, is shown as resistor R1 in FIG. 2. R1 forms one branch of a bridge circuit, the other branches of which are provided by resistor R2, resistor R3, and resistor R4 connected in series with field effect transistor Q1. R1 is connected in series with R2, while R3 is connected in series with the branch consisting of R4 and Q1. A positive voltage supply is connected through resistor R5 to the junction between R2 and R3, while the opposite end of R1 and the drain of Q1 are connected to ground. Three diodes D1, D2 and D3 are connected between the upper and lower terminals of the bridge circuit for overvoltage protection.

The ungrounded sides of the Q1 and R1 branches are connected to the first stage of a two-stage amplifier circuit through resistors R6 and R7, respectively. The amplifier circuit consists of operational amplifiers 30 and 32. Amplifier 30 is bridged by capacitor C1 and connected to the positive voltage supply through resistor R8 and grounded capacitor C2. Amplifier 32 is bridged by capacitor C3, and connected to the positive supply voltage through resistor R9 and grounded capacitor C4. Amplifiers 30 and 32 are also connected in circuit with a negative voltage supply through resistor R10 and capacitor C5, and resistor R11 and capacitor C6, respectively. One input of amplifier 32 is grounded through resistor R12, while the other input is connected to the output of amplifier 30 through resistor R13.

The output of amplifier 32 is connected to the gate of Q1 through a feedback circuit which includes series connected resistors R14 and R15. Another series circuit comprising resistor R16 and capacitor C7 is connected from the junction of R14 and R15 to ground.

The amplifier circuit compares the voltages across the R1 and Q1 branches, and amplifies any differential between them. The amplified difference signal is transmitted through the feedback circuit to the gate of Q1, such that the effective impedance of Q1 is adjusted to balance the voltages across the two branches. However, the amplifier circuit has a finite response time, and the provision of capacitor C7 in the feedback circuit introduces an additional response time. The feedback RC circuit is designed such that the overall response time of the amplifier and feedback circuits is greater than the expected duration of transient signals which the sensing apparatus is intended to isolate and detect. Thus, short term transient disturbances in the resistance value of variable resistor R1 result in an imbalance between the inputs to amplifier 30. This imbalance appears at the output of amplifier 32 as a transient response having a duration corresponding to the overall response time of the amplifier and feedback circuits. If R1 is subjected to a long term, steady change in value, for example resulting from pumping down a vacuum system from atmospheric to a vacuum pressure, the output of amplifier 32 will assume a steady state value, while a constant resistance value for R1 will result in a zero output from amplifier 32.

In the above circuit operation, the voltage across the Q1 branch lags the voltage across R1 by the overall response time. The Q1 branch may be considered to be an adjustable reference circuit, since it provides a reference, at about one overall response time previous, to which the present resistance of R1 may be compared.

The output of amplifier 32 is AC coupled to a final amplifier stage 34 through a filter circuit consisting of resistor R17 and non-polarized capacitors C8 and C9, all connected in series. This filter circuit blocks low frequency components at the output of amplifier 32. Amplifier 34 is bridged by capacitor C10, is connected to the positive voltage supply through resistor R18 and grounded capacitor C11, and is connected to the negative voltage supply through resistor R19 and grounded capacitor C12. The other input to amplifier 34 is grounded through resistor R19'.

The output of amplifier 34 is in turn connected through resistor R20 to a meter 36. The gain of amplifier 34 can be controlled be means of a feedback connection through one of selectable resistors R21-R30.

In operation, a long term rate of change in the resistance of R1 will appear at the output of amplifier 34 as a steady state signal, while a transient disturbance in the rate of change of the resistance of R1 will appear as a transient output signal from amplifier 34, as described above. The steady state signal resulting from a long term change is filtered out, and meter 36 does not provide any indication. Short term transient changes, however, are transmitted through the filter circuit and amplified by amplifier 34, to appear as a transient deflection on meter 36. Thus, the transient pressure effects of small leak testing can be detected, while the effects of long term pumping from atmospheric to vacuum pressure, pump speed drift or gross leaks are nulled out. The circuit of course also functions in connection with small leak testing should a condition of constant vacuum actually be achieved.

While a particular embodiment of the invention has been shown and described, it should be understood that various modifications and alternate presentations thereof may occur to those skilled in the art. Accordingly, it is intended that the invention be limited only to the terms of the appended claims.

I claim:

1. In a pressure sensing apparatus having means for generating an electrical signal corresponding in magnitude to a sensed pressure, the improvement comprising means for isolating and detecting short term transient disturbances in the rate of change of the sensed pressure, said means comprising:

an adjustable reference circuit establishing an adjustable reference signal, a comparison circuit for comparing the pressure signal with the reference signal and for producing an output signal representative of the differential between the compared signals, and a feedback circuit having a response time which together with the response time of the comparison circuit introduces an overall response time which is greater than substantially the duration of the transient disturbance sought to be detected, said feedback circuit being connected from the output of the comparison circuit to the adjustable reference circuit to adjust the reference signal to a predetermined relationship with respect to the pressure signal, as delayed by said overall response time, whereby substantially constant rates of pressure change appear as steady state signals at the output of the comparison circuit and short term transient deviations from said constant rates appear at the output of the comparison circuit as deviations from said steady state signals.

2. The pressure sensing apparatus of claim 1, and further including filter means connected to the output of the comparison circuit, said filter means being adapted to remove low frequency components from the signal at the output of the comparison circuit, and thereby provide an automatic nulling circuit having a response at the output of the filter means only to short term transient disturbances in the rate of change of the sensed pressure.

3. The pressure sensing apparatus of claim 2, said apparatus being sensitive to a range of pressure rates of changes substantially greater than the transient disturbances sought to be detected, whereby a long term change in pressure can be monitored for short term, transient disturbances therefrom.

4. The pressure sensing apparatus of claims 1 or 2, further comprising readout means connected to display detected transient pressure rate disturbances.

5. In a pressure sensing apparatus having a variable impedance element, the impedance value of said element corresponding to a sensed pressure, the improvement comprising an automatic nulling circuit for nulling long term pressure changes while isolating and detecting short term transient disturbances in the rate of change of the sensed pressure, said means comprising:

a bridge circuit incorporating said variable impedance element as one branch, and an adjustable circuit means as another branch, the impedance of said adjustable circuit means being adjustable to substantially balance the operative impedance of said variable impedance element, means for supplying a voltage across said bridge circuit, amplifier means connected to amplify the voltage differential between said variable impedance element and adjustable circuit means;

a feedback circuit having a response time which, together with the response time of the amplifier means, introduces an overall response time which is greater than substantially the duration of the transient disturbances sought to be detected, said feedback circuit being connected between the output of said amplifier means and an adjustment input to said adjustable circuit means, the impedance of said adjustable circuit means being balanced with the impedance of said variable impedance element, as delayed by said overall response time, in response to the received feedback signal, whereby the amplifier output represents the difference between the present impedance of the variable impedance element and the impedance of said element at substantially one overall response time previous, and filter means connected to the output of the amplifier means for removing low frequency components from the amplifier means output, and thereby provide an automatic nulling circuit having a response at the filter means output substantially only to short term transient disturbances in the rate of change of sensed pressure.

6. The pressure sensing apparatus of claim 5, said adjustable circuit means including a transistor means, said feedback circuit being connected to control the effective impedance of said transistor means in the bridge circuit.

7. The pressure sensing apparatus of claim 6, said transistor means comprising a field effect transistor.

8. The pressure sensing apparatus of claim 6, said adjustable circuit means further including a resistor element connected in series with said transistor means.

9. The pressure sensing apparatus of claims 5 or 6, said amplifier means comprising a two-stage amplifier, with said bridge circuit connected to the input of one of the stages, and said feedback circuit connected to the output of the other stage.

10. The pressure sensing apparatus of claim 5, further comprising readout means connected to display detected transient disturbances in the rate of pressure change.

* * * * *